(12) United States Patent
Huang

(10) Patent No.: US 12,532,173 B2
(45) Date of Patent: Jan. 20, 2026

(54) SECURED POSITION AWARE CONTINUOUS AUTHENTICATION MESH NETWORK

(71) Applicant: Wells Fargo Bank, N.A., San Francisco, CA (US)

(72) Inventor: Jason Huang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 127 days.

(21) Appl. No.: 18/421,779

(22) Filed: Jan. 24, 2024

(65) Prior Publication Data

US 2025/0240622 A1 Jul. 24, 2025

(51) Int. Cl.
*H04W 12/06* (2021.01)
*H04W 12/065* (2021.01)
*H04W 12/104* (2021.01)
*H04W 12/64* (2021.01)
H04W 84/18 (2009.01)

(52) U.S. Cl.
CPC ....... *H04W 12/065* (2021.01); *H04W 12/104* (2021.01); *H04W 12/64* (2021.01); *H04W 84/18* (2013.01)

(58) Field of Classification Search
CPC .. H04W 12/065; H04W 12/64; H04W 12/104
See application file for complete search history.

(56) References Cited

U.S. PATENT DOCUMENTS

| | | | |
|---|---|---|---|
| 8,747,313 B2 | 6/2014 | Tran et al. | |
| 9,408,036 B2 | 8/2016 | Hart et al. | |
| 9,674,684 B1 | 6/2017 | Mendelson | |
| 10,448,211 B1* | 10/2019 | Shen | G06K 7/10366 |
| 11,244,355 B2 | 2/2022 | Walden et al. | |
| 11,734,758 B2 | 8/2023 | Henson et al. | |
| 2011/0068906 A1* | 3/2011 | Shafer | G06K 7/10475 340/10.3 |
| 2013/0091452 A1* | 4/2013 | Sorden | G06F 30/20 715/771 |
| 2014/0135042 A1* | 5/2014 | Buchheim | G01S 1/725 455/566 |
| 2015/0373482 A1* | 12/2015 | Barnard | H04W 4/40 370/338 |
| 2017/0245104 A1* | 8/2017 | Klimek | G01S 5/0226 |

(Continued)

*Primary Examiner* — William S Powers
(74) *Attorney, Agent, or Firm* — SCHWEGMAN LUNDBERG & WOESSNER, P.A.

(57) ABSTRACT

Systems and methods are directed to securing network access using a digital gate constructed by position-aware compute beacons that form a beacon mesh. A compute beacon in the beacon mesh, detects a request for access from a client device. In response, the beacon mesh, performs a validation process to validate that the client device is located within a digital gate formed by the beacon mesh. The validation process includes detecting, by at least three compute beacons within the beacon mesh, a received signal strength indicator (RSSI) from the client device; triangulating a position of the client device based on the RSSI; and determining whether the position of the client device is within the digital gate. Based on a result, the compute beacon provides a reply to the client device either comprising a challenge request or a session rejection. Subsequently authentication of the client device results in network access.

20 Claims, 8 Drawing Sheets

(56) References Cited

U.S. PATENT DOCUMENTS

| | | | |
|---|---|---|---|
| 2017/0270481 A1* | 9/2017 | Morgenthau | H04W 4/80 |
| 2018/0041247 A1* | 2/2018 | Zakaria | H04B 3/542 |
| 2019/0068382 A1* | 2/2019 | Theodore | H04W 12/06 |
| 2019/0385113 A1 | 12/2019 | Dumitras | |
| 2021/0019691 A1 | 1/2021 | Vangell et al. | |
| 2021/0058383 A1* | 2/2021 | Colon | H04W 12/61 |
| 2021/0122335 A1 | 4/2021 | Foster et al. | |
| 2021/0174952 A1* | 6/2021 | Leong | G06N 20/00 |
| 2021/0263851 A1* | 8/2021 | Kimelman | G06F 12/0811 |
| 2023/0261938 A1* | 8/2023 | Griffin | H04L 41/082 |
| | | | 709/220 |
| 2024/0362994 A1* | 10/2024 | Daoura | G08C 17/02 |

* cited by examiner

SECURED POSITION AWARE CONTINUOUS AUTHENTICATION MESH NETWORK

TECHNICAL FIELD

The subject matter disclosed herein generally relates to network access security. Specifically, the present disclosure addresses systems and methods that secure network access using a digital secure gate constructed by position-aware compute beacons that form a beacon mesh network.

BACKGROUND

Businesses and individuals are concerned with risk mitigation and information security. For instance, if a company develops an algorithm that is business critical, the company does not want that algorithm leaked or made public. Thus, the company will want to secure their devices within a secure digital fence area. Typical proximity systems can be used to detect outgoing and incoming client devices. These proximity systems (e.g., existing beacon technology) require the client device to report telemetry data or their position. Additionally, these proximity systems are not position aware, not secured, and do not compute session data.

BRIEF DESCRIPTION OF THE DRAWINGS

Some embodiments are illustrated by way of example and not limitation in the figures of the accompanying drawings.

DETAILED DESCRIPTION

Figure 1:
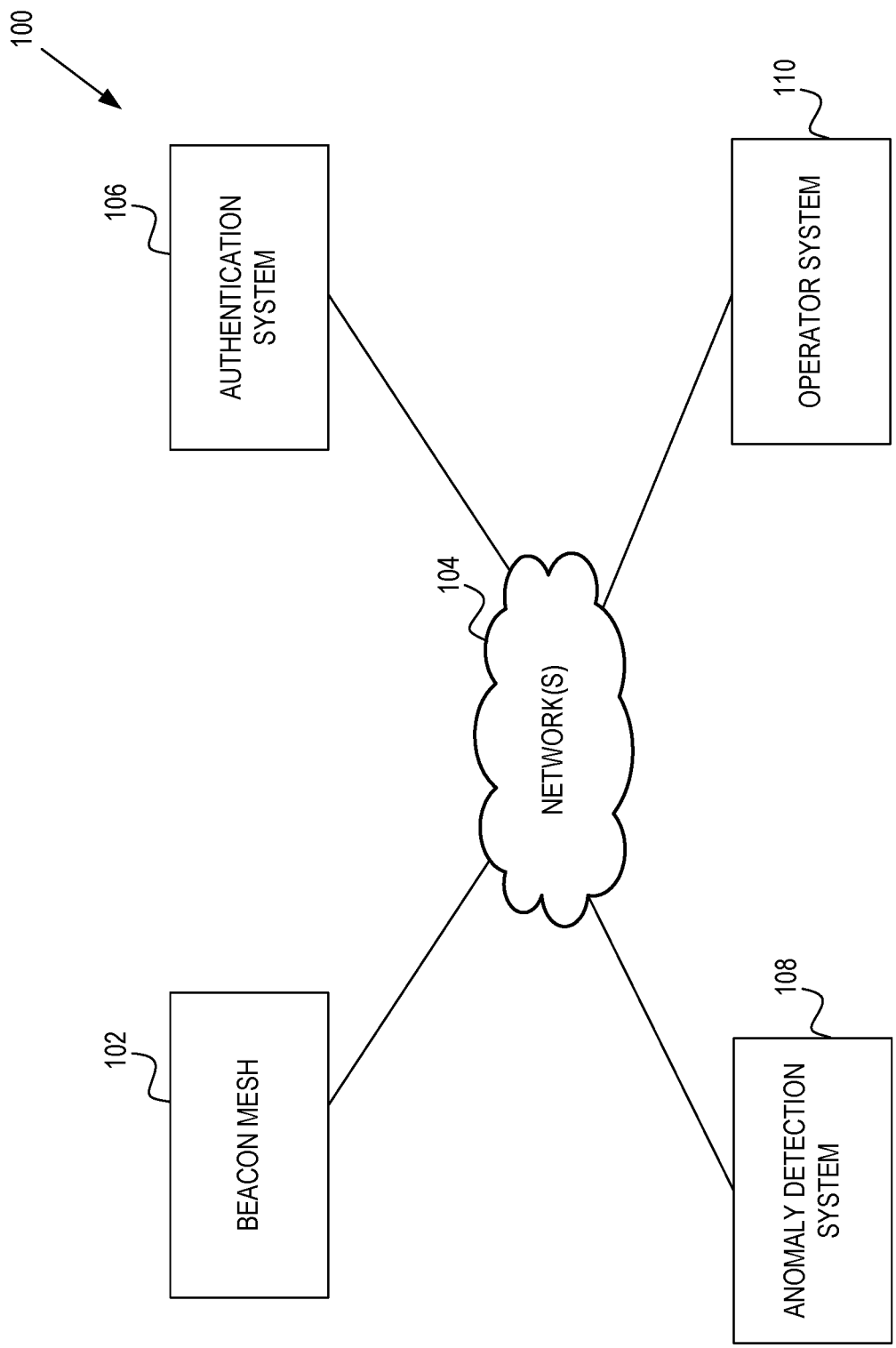
FIG. 1 is a diagram illustrating a network environment suitable for providing a digital gate constructed by position-aware compute beacons that form a beacon mesh network, according to some example implementations.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to providing network access security using a digital secure gate (also referred to as a "digital gate"). The digital gate is constructed using a network of position-aware compute beacons (referred to herein as a "beacon mesh" or "beacon mesh network") that are coupled via a wireless network. The beacon mesh requires a client device to be within the digital gate to access a network or device. Once the client device leaves an area defined by the digital gate, the client device will receive a session revoke message and/or the client device ceases to function.

Each compute beacon comprises computing functionality that allows it to perform a validation process to validate that a client device that is requesting access is located within the digital gate. In example implementations, the validation process includes detecting by three or more of the compute beacons within the beacon mesh, a received signal strength indicator (RSSI) from the client device. The beacon mesh then triangulates the position of the client device based on the RSSI and determines whether the position of the client device is within the digital gate. After the initial grant of access, the beacon mesh continuously or repeatedly secures a device session by checking that the beacon mesh remains intact, validating that the client device is still within the digital gate, and sharing a mutual challenge that the client device has to solve to be able to access further data or maintain the session.

As a result, example implementations provide a technical solution to the technical problem of securing network access. In particular, the technical solution employs position-aware compute beacons that form a digital gate. The compute beacons continually determine whether the client device remains within the digital gate and responds correctly to challenges. As soon as the client device leaves the digital gate or provides an invalid response, network access is revoked, and the client device becomes inoperable. The technical solution does not require the client device to report telemetry data or their position, which may not be accurate or can be falsified. Thus, example implementations provide an additional advantage in which security cannot be easily tampered with.

FIG. 1 is a diagram illustrating a network environment 100 suitable for providing a digital gate constructed by position-aware compute beacons that form a beacon mesh 102, in accordance with example implementations. The beacon mesh 102 is communicatively coupled, via a network 104, to an authentication system 106, an anomaly detection system 108, and an operator system 110. The beacon mesh 102 forms a digital gate in which a client device (not shown) must be located in order to access data, a secured network, and/or a secured device. The client device can be any device that needs to connect to the secured network in which the client device needs to be authenticated. For example, the client device can be a mobile device (e.g., smartphone), laptop, IoT (Internet of Things) device, or any other device that can connect to a local network.

The beacon mesh 102 is integrity aware such that after an initialization process (discussed further below), at least one (e.g., each) compute beacon contains a distributed census, in some examples. The census includes a number of compute beacons that exist in the beacon mesh 102, unique identifiers of each compute beacon in the beacon mesh 102, and a location of each of the compute beacons. An integrity check can then be performed at various intervals to ensure that all the compute beacons listed in the census are present/intact and no additional compute beacons (e.g., not on the census) detected. The beacon mesh 102 and the digital gate will be discussed in more detail in connection with FIG. 2.

The authentication system 106 is a component or service (e.g., server) that validates credentials of the client device and authenticates the client device. In example implementations, the authentication system 106 receives from the beacon mesh 102 a request to validate the credentials along with the credentials. If the credentials are validated, a valid response is sent by the authentication system 106 which triggers the beacon mesh 102 to generate an encrypted challenge. A solution to the challenge is relayed back through the beacon mesh 102 and used by the authentication system 106 to authenticate the client device. Thus, the authentication system 106 both validates credentials and authenticates the client device in example implementations.

The anomaly detection system 108 is a component or service (e.g., server) configured to manage and log anomalies in the network environment 100. For example, if one of the compute beacons malfunctions (e.g., is missing during an integrity check) or a beacon not on the census detected, the beacon mesh 102 reports the anomaly to the anomaly detection system 108. As another example, one of the compute beacons may have been attacked and needs to be re-initialized.

In some implementations, the anomaly detection system 108 generates and provides a web interface to a device of user (e.g., an administrator) that manages the network environment 100. The user can, via the web interface, view logs or notices of the anomalies and, if necessary, trigger other components of the network environment 100 to perform operations.

As an example, if the beacon mesh 102 fails the integrity check, the user can trigger the operator system 110 to reset or re-initialize. The operator system 110 is a component or service (e.g., server) configured to control or manage the compute beacons and the digital gate. Once the digital gate is constructed, a user/administrator can control the digital gate using a web interface. Thus, if one of the compute beacons fails, the operator system 110 triggers the compute beacons to re-initialize without the compute beacon that failed, thus generating a new census and digital gate without the presence of the failed compute beacon. It is noted that the operator system 110 also performs the initialization process as will be discussed in more detail below.

Any of a variety of types of connections and networks 104 may be used in the network environment 100. For example, the connection to the network 104 can be a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. Accordingly, a variety of different configurations are expressly contemplated.

In example implementations, any of the systems, devices, or networks (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 7, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other computers that lack the structures discussed herein or are otherwise unable to perform the functions discussed herein. Accordingly, a special-purpose machine configured according to the systems and methods discussed herein provides an improvement to the technology of similar machines.

Moreover, any of the components illustrated in FIG. 1 or their functions may be combined, or the functions described herein for any single component may be subdivided among multiple components. While the network environment 100 is shown and discussed with compute beacons in the beacon mesh 102 performing operations as a decentralized system, alternative implementations may provide a centralized system in which a central control system manages and maintains the mesh network (e.g., beacon mesh). In these implementations, the central control system receives data (e.g., signals) from the compute beacons and performs the operations of the compute beacons (e.g., triangulate positions, report anomalies, generate encrypted challenges). In these implementations, the anomaly detection system 108 can be a part of the central control system. The operations and data flow between the different components of the network environment 100 are discussed in more detail below.

Figure 2:
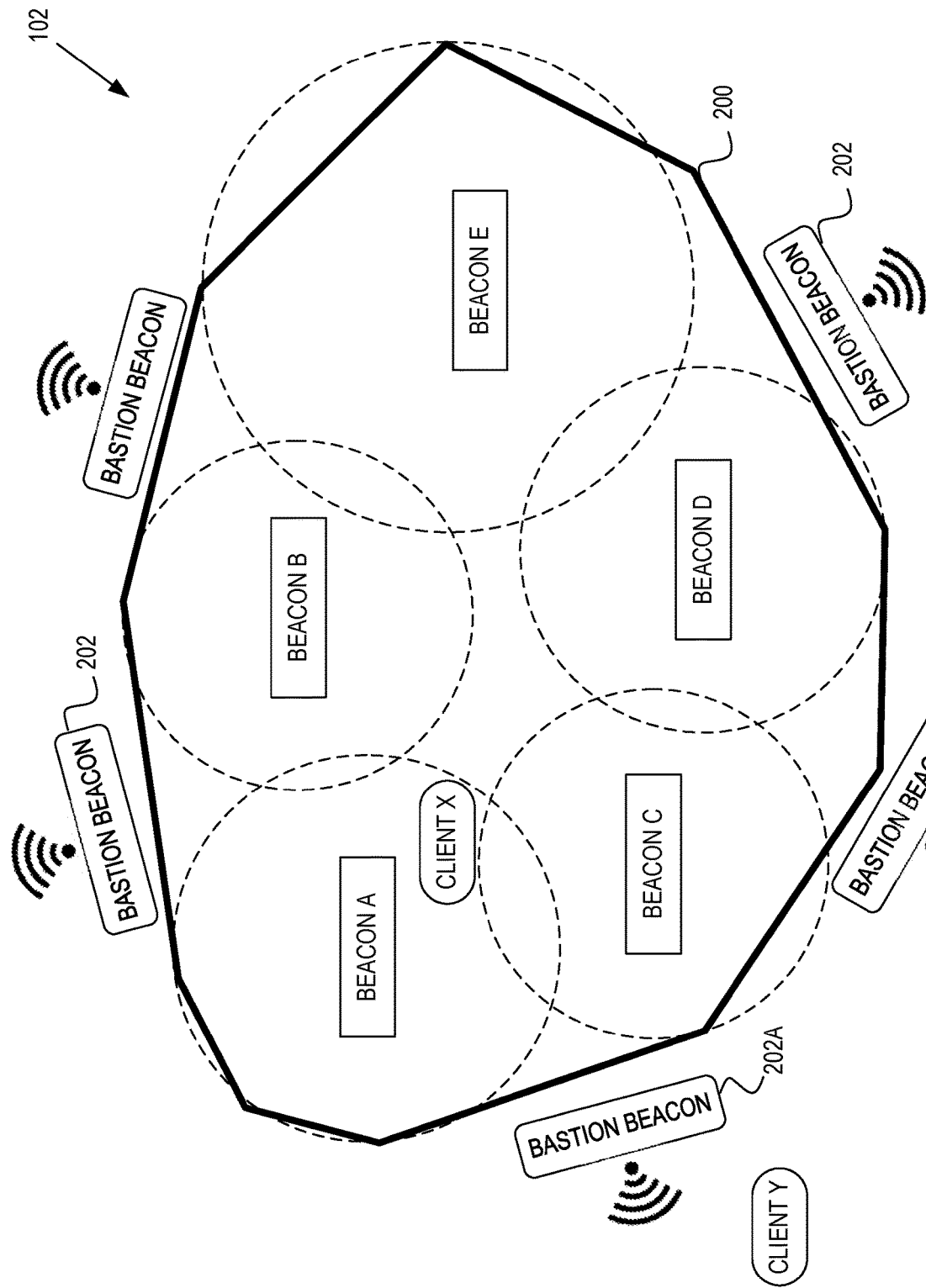
FIG. 2 is a diagram illustrating an example digital gate constructed by the beacon mesh network, according to some example implementations.

FIG. 2 is a diagram illustrating an example digital gate 200 constructed by the beacon mesh network 102, according to some example implementations. The digital gate 200 is constructed by a plurality of position-aware compute beacons (Beacon A, B, C, D, E) where a location is disclosed within a first beacon (also referred to as an "origin beacon") and other compute beacons determine and relay their locations to the origin beacon and/or other compute beacons that are in the mesh network 102. Each compute beacon can be equipped with a collection of unique chipsets, such as a ultrawide band radio, Bluetooth low energy radio, Wi-Fi compatible radio, gyroscopic sensors, manometer sensors, and/or barometric sensors. These sensors work in tandem to provide accurate and precise telemetry data to each compute beacon. This makes the compute beacons position aware.

More specifically, the origin beacon has a known position (e.g., coordinates using longitude and latitude). When a second compute beacon connects to the origin beacon, the second compute beacon obtains the position and a received signal strength indicator (RSSI) from the origin beacon. Because the origin beacon has known coordinates (e.g., longitude and latitude), the second compute beacon can calculate its distance from the origin beacon based on the RSSI and determine its location. For a compute beacon that is not in range of the origin beacon, the compute beacon obtains a location and RSSI of a closer compute beacon which has already determined its position with respect to the origin beacon. The compute beacon that is not in range can then determine its position and relay that information back to the origin beacon through the closer compute beacon. This process can be performed by the plurality of compute beacons (minus the origin beacon) and a map of all the compute beacons generated. Each compute beacon may use ultrawide band or millimeter wavelength wireless bans. By using ultrawide band sensors, the precision of measurement can be ±10 millimeters in example implementations. Additionally, any number of compute beacons can be deployed in any number of locations. Because the beacon mesh 102 is position aware, each compute beacon can be geolocated back to the origin beacon. This is part of the initialization process of the beacon mesh 102.

As an example, assume beacon A is the origin beacon that has its location. The beacons are omnidirectional whereby each compute beacon can send and receive a wireless signal and signals can overlap between some of the beacons. For example, the dashed circles illustrate signals used to connect to the client device. Beacon B and Beacon C can determine their locations based on the location of Beacon A and the RSSI from Beacon A. Beacon E can then determine its location based on the location of Beacon B and the RSSI from Beacon B.

The origin beacon A can obtain locations from compute beacons that are within its range, and locations of compute beacons not in range through relay. For instance, Beacon A can obtain locations from Beacon B and Beacon C. Similarly, Beacon B can obtain locations from Beacon A and Beacon E, and so on. The location information can also be relayed between the compute beacons. Because Beacon E is far from Beacon A, for example, Beacon A can obtain the location information from Beacon B which has a signal that overlaps with Beacon E.

Once the locations of the compute beacons are determined, the beacon mesh 102 is established and the digital gate 200 constructed. In example implementations, the polygonal digital gate 200 is construct using built-in tangential intersection algorithms that compute tangential intersection between compute beacons in the beacon mesh 102. In implementations that use ultrawide band radios that transmit in an omnidirectional area, linear lines are drawn where each beacon intersects.

During the initialization process, the origin beacon creates a census. The census is a list of the plurality of compute beacons in the beacon mesh 102. With each additional compute beacon that is added, the origin beacon appends a unique identifier of the additional compute beacon and its location to the census. At the completion of the initialization process, the census is distributed to all of the compute beacons in the beacon network 102. This allows each compute beacon to check the integrity of the beacon mesh as will be discussed in more detail below. Additionally, because of the census list, each compute beacon is aware of its position in space.

When client device X (referred to herein as "Client X") enters the digital gate 200, Client X will request access to the network and the closest compute beacon will detect the request. In the example of FIG. 2, the closest compute beacon is Beacon A. Beacon A will then check network integrity of the beacon mesh 102. Each compute beacon in the beacon mesh 102 communicates with each other to ensure each compute beacon is intact. In one implementation, the plurality of compute beacons are in real-time communication with each other via wireless N.n GHz band (e.g., 2.4 GHz, 5.0 GHz, etc.). Every individual compute beacon sends back a response to an integrity check request. Beacon A then checks its census to determine whether all compute beacons are present (e.g., had sent a response).

If all compute beacons are present and functional, then Beacon A starts an authentication process for Client X. The authentication process includes validating that Client X is within the polygonal digital gate 200, validating credentials of Client X by the authentication system 106, and providing a challenge request to Client X. If Client X is within the digital gate, is authenticated, and responds successfully to the challenge request, then network access is granted.

The beacon mesh 102 continuously secures the network. In various implementations, the compute beacon closest to the Client X checks the integrity of the beacon mesh 102, checks that Client X remains within the digital gate, and checks that a response to challenge request is correct for each resource request received from Client X. Because Client X can move around within the digital gate 200, the closest compute beacon can change.

In example implementations, a plurality of bastion beacons 202 also guard the digital gate 200. The bastion beacons 202 are unidirectional (in a direction away from the digital gate) and located outside of the digital gate 200. In some cases, the bastion beacons 202 are positioned between every two compute beacons. If a bastion beacon detects a client device, the bastion beacon will report the detection to the closest compute beacon. For example, if Client Y leaves the digital gate 200, the bastion beacon 202A detects Client Y. Bastion beacon 202A then reports to Beacon C, which is the closest compute beacon, the outgoing risk. Similarly, the bastion beacon 202 can report any incoming threats that it detects to the closest compute beacon. The compute beacon then reports the anomaly to the anomaly detection system 108. Additionally, the beacon mesh 102 revokes network access by Client Y if it was previously granted access and Client Y will cease to function.

Figure 3:
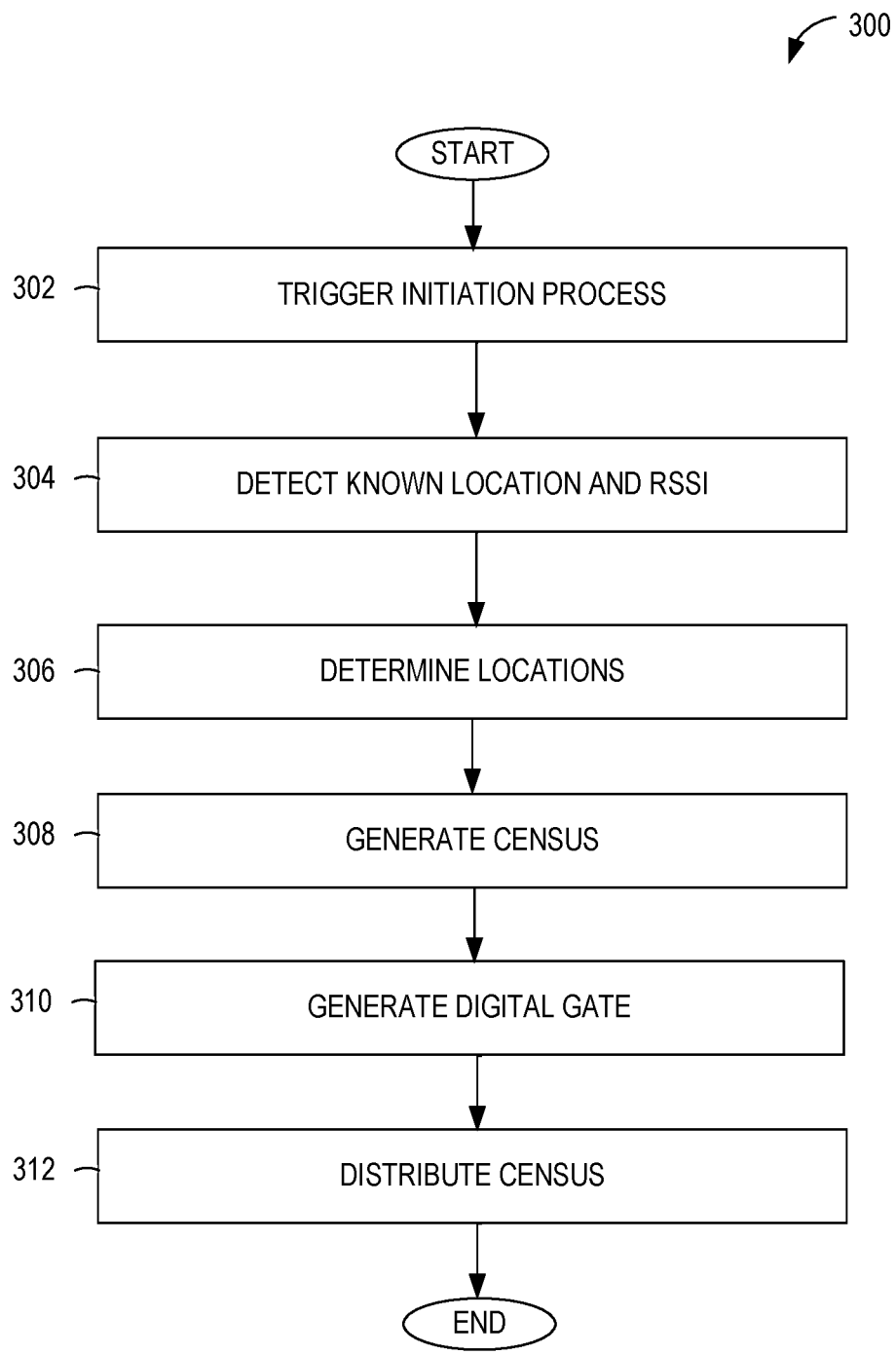
FIG. 3 is a flowchart illustrating operations of a method for initializing the beacon mesh network and constructing the digital gate, according to some example implementations.

FIG. 3 is a flowchart illustrating operations of a method 300 for initializing the beacon mesh 102 and constructing the digital gate 200, according to some example implementations. Operations in the method 300 may be performed by the compute beacons in the network environment 100 described above with respect to FIG. 1 and FIG. 2. Accordingly, the method 300 is described by way of example with reference to these components in the network environment 100. However, it shall be appreciated that at least some of the operations of the method 300 may be deployed on various other hardware configurations or be performed by similar components residing elsewhere in the network environment 100. Therefore, the method 300 is not intended to be limited to these components.

In operation 302, an initialization process is triggered. In some implementations, a user/operator triggers the initialization process through the operator system 110. The operator system 110 then triggers the compute beacons to perform the initialization process. In some cases, the initialization process is triggered when a new compute beacon is added or an existing compute beacon removed. The initialization process (or reinitialization) can also be triggered after an anomaly in network integrity detected.

In operation 304, the compute beacons each detect a known location and RSSI from a nearby compute beacon that has the known location (also referred to as a "known beacon"). For example, an origin beacon has a known location. A first set of compute beacons within signal range of the origin beacon detects the RSSI of the origin beacon and obtains the known location of the origin beacon. The known location can be, for example, a longitude and latitude. Based on the known location of the origin beacon and the RSSI, the first set of compute beacons can each determine their location in operation 306. These compute beacons can report their location back to the origin beacon along with their unique identifier. The origin beacon generates a census in operation 308 by recording the unique identifier and corresponding location.

Operations 304-306 can be repeated for other compute beacons not in range of the origin beacon. Once the locations are determined for the first set, a second set of one or more compute beacons that are not within the range of the origin beacon but in range of one of the compute beacons in the first set can detect the now-known location and RSSI of the compute beacon from the first set in operation 304. The second set can then determine their locations in operation 306. The locations and unique identifiers of the second set are relayed to the origin beacon by the first set of compute beacons and the origin beacon updates the census to include the second set data in operation 308. These operations can be repeated until all compute beacons in the network environment 100 are located.

In operation 310, the digital gate is generated based on locations of all the compute beacons in the beacon mesh 102. Using the locations, a polygonal digital gate is constructed using algorithms that compute tangential intersections of the compute beacon. Because the compute beacons use ultrawide band radios that transmit in an omnidirectional area, in essence, linear lines are "drawn" where each compute beacon intersects in accordance with some implementations.

At the end of the initialization process, the origin beacon distributes the census to all of the other compute beacons in the beacon mesh 102 in operation 312. For example, the origin beacon transmits the census to the first set of compute beacons, which can then relay the census to the second set of compute beacons, and so on.

Figure 4A:
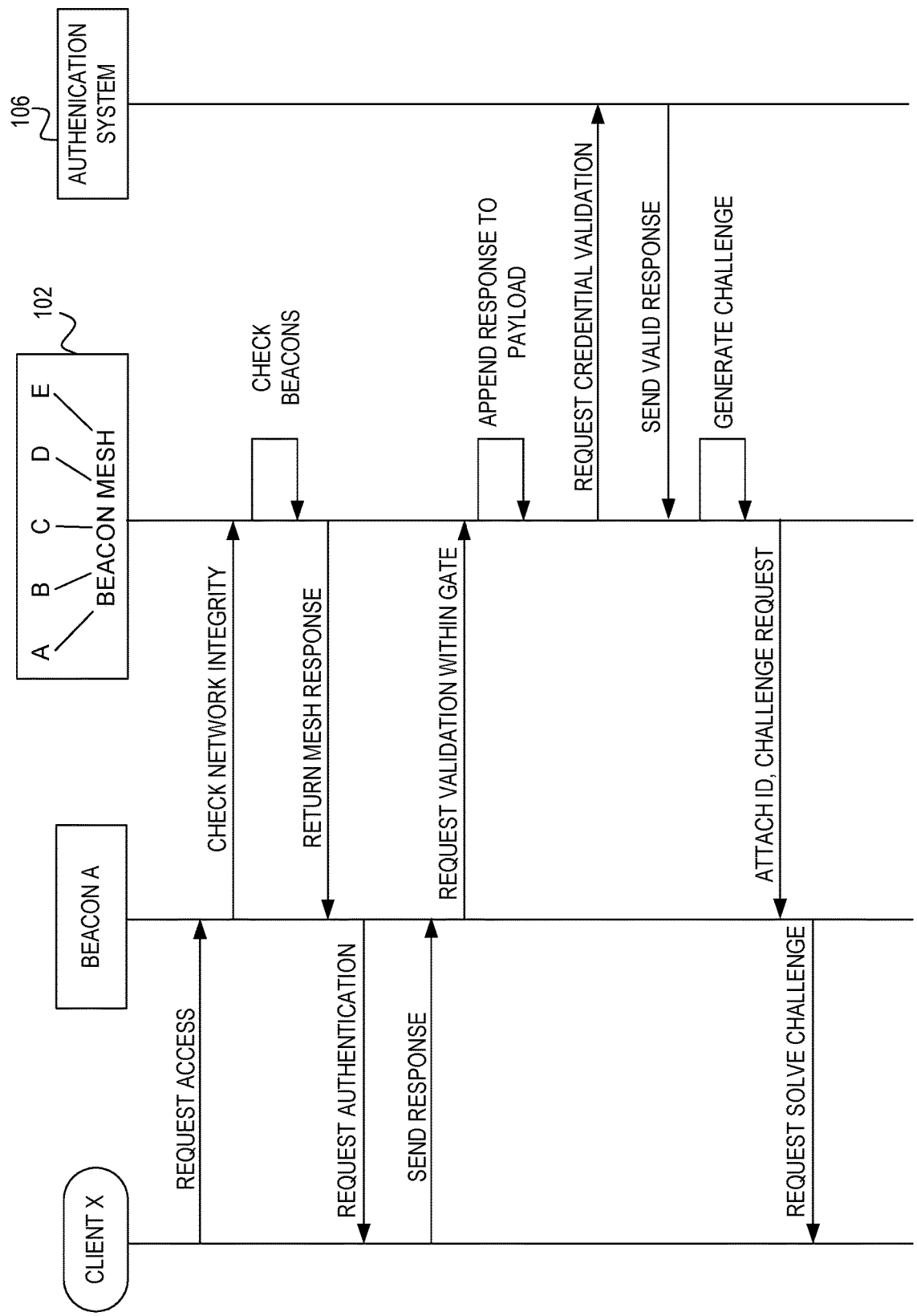
FIGS. 4A and 4B are flow diagrams illustrating operations performed by components in the network environment to provide secured access to data within the digital gate, according to some example implementations.
Figure 4B:
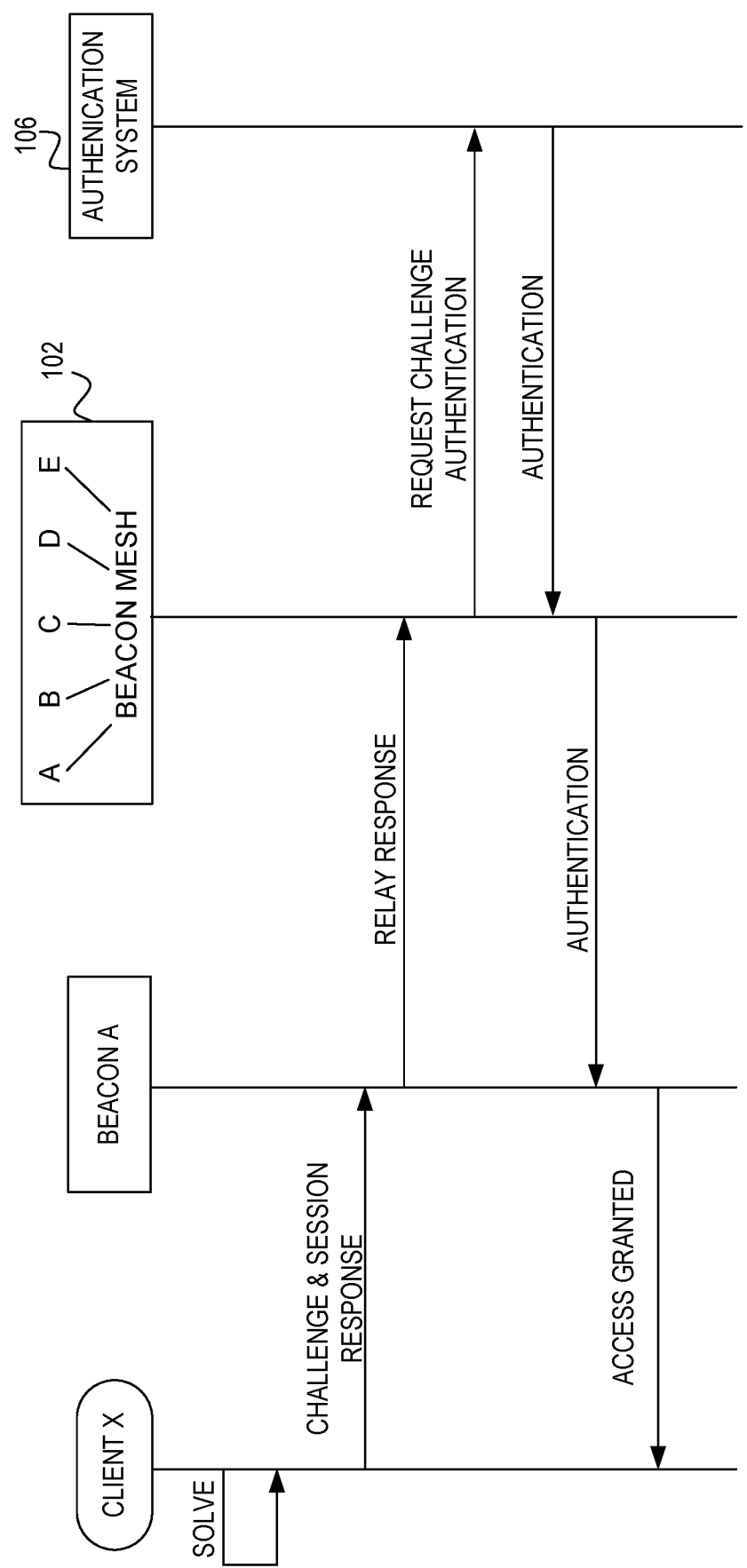

FIGS. 4A and 4B are flow diagrams illustrating operations performed by components in the network environment 100 to provide access to data within the digital gate 200, according to some example implementations. The flow diagram is discussed in relations to the example digital gate of FIG. 2. Initially, the client device (Client X) enters the digital gate 200 and requests access. The closest compute beacon, here Beacon A, detects the request. In some implementations, the request includes a credential of Client X.

In response to detecting the request for access, Beacon A performs a check of the beacon mesh network 102 integrity. In some implementations, Beacon A transmits an integrity check request to the other compute beacons in the beacon mesh 102. The integrity check request is received directly by the compute beacons within signal range of Beacon A and can be relayed to other compute beacons not within the signal range. Each individual compute beacon that receives the integrity check request confirms that it is intact and sends a response. The responses from the beacon mesh 102 can be relayed back to Beacon A through other compute beacons for compute beacons not within signal range of Beacon A. Beacon A examines its census to determine whether all compute beacons have responded (e.g., are intact and present). If all compute beacons on the census respond, the integrity of the beacon mesh 102 is verified.

If the number of compute beacons responding do not correlate with the census (e.g., one or more compute beacons are missing) or sending an invalid response, the beacon mesh network 102 as a whole can cease to function and may, for example, need to be reinitialized. In these cases, the anomaly detection system 108 is notified of the discrepancy by Beacon A.

If the integrity is verified, Beacon A starts an authentication process to authenticate Client X. Accordingly, Beacon A transmits an authentication request to Client X. In response, Client X indicates it is ready for authentication by sending a response asking what it needs to do to be authenticated.

Responsive to receiving the authentication response, Beacon A requests the beacon mesh 102 to validate whether Client X is within the digital gate 200. This validation process includes determining how far Client X is from at least three compute beacons of the beacon mesh 102 including Beacon A. The beacon mesh 102 (e.g., the at least three compute beacons) detects a received signal strength indicator (RSSI) of Client X. Based on the RSSI, each of these compute beacons calculates a distance to Client X and the beacon mesh 102 triangulates a position of Client X. For example, Beacon A has the location of Beacon B and Beacon C. Given that Client X is five feet from Beacon A, seven feet from Beacon B, and eight feet from Beacon C, Beacon A can triangulate and obtain Client X's position.

It is noted that because Beacon B and Beacon C also has the census which includes Beacon A's location, Beacon B or Beacon C can perform the triangulation and determine Client X's position. In some cases, load balancing may be used to distribute computing operations between the various compute beacons in the beacon mesh 102. This is important for situations when, for example a large number of client devices are within the digital gate 200 and located near a same compute beacon which may become overloaded. In other cases, group computing can be utilized whereby only a select few of the compute beacons have computational ability. In these cases, the compute beacons that do not have computational ability may forward computations (or sensor data) to a compute beacon that does have the computational ability.

In an alternative implementation, a central control system can perform the computations instead of the beacon mesh 102. In this implementation, the beacons in the beacon mesh send the computational load or the sensor data to the central control system (e.g., a central computer/server) for processing.

Based on a determination that Client X is within the digital gate 200, a result of the validation process is appended to a payload and a request sent to the authentication system 106 to validate the credentials of Client X. In some cases, the result appended to the payload indicates the location, while in other cases, the result appended to the payload merely indicates that Client X is within the digital gate or within Beacon A's (and/or other compute beacon's) range. If Client X is not within the digital gate, the access request is denied and Client X may be shut down.

In some implementations, the credentials are based on an asymmetric key. An asymmetric key pair is stored on the client device during a set up process of the client device that has built-in credentials such that passwords do not need to be used. Thus, the credentials can be provided by the client device with the request to access the network, in the authentication response, or any time between. Assuming the credentials are validated, the authentication system 106 sends a valid response back to the beacon mesh 102.

The beacon mesh 102 then generates an encrypted challenge using a stored public key. The public key can be sent, for example, with the credentials. In example implementations, the compute beacons have the ability to compute complex encryption algorithms as a collective. Thus, the workload can be distributed as chunks via wireless interface to compute beacons in the beacon mesh 102 and each compute beacon performs some computation. The results are then relayed back to a main compute beacon (e.g., the compute beacon closest to the client device). The main compute beacon then "stitches" the chunks back together and verifies a signature of the payload before sending it to Client X. For instance, if the payload is 256 bits, the signature should indicate that it is 256 bits. In an alternative implementation, the closest compute beacon to Client X generates the encrypted challenge using the public key that is sent with the credentials.

The challenge is sent back to Client X with an attached session identifier, a challenge request, and, in some cases, a timestamp. Client X solves the challenge and sends a challenge and session response back to Beacon A, which may relay the challenge and session response through the beacon mesh 102. A request for authentication along with the challenge response are transmitted to the authentication system 106. The authentication system 106 authenticates the client device and verifies the challenge response. The authentication system 106 then sends an authentication response back to the beacon mesh 102 to Beacon A. Assuming Client X is authenticated, Beacon A grants access to Client X.

In the case where Client X sends an invalid challenge response, the public key used to solve the challenge may have expired or is fake. In these situations, the beacon mesh 102 notifies the anomaly detection system 108, which can trigger a notification to a user/administrator of the network environment 100.

Figure 5:
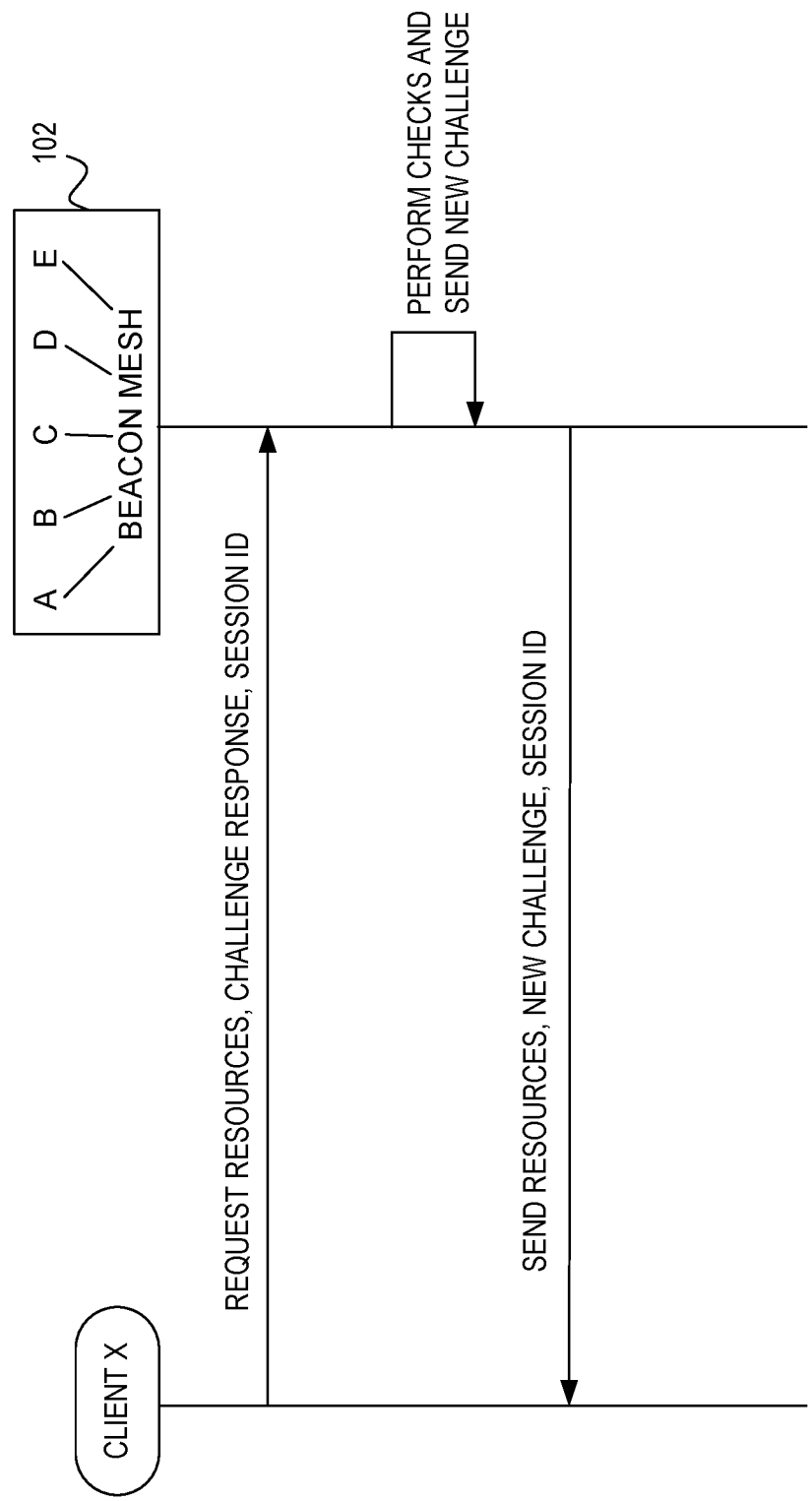
FIG. 5 is a flow diagram illustrating operations to continuously secure a device session, whereby the client device remains within the digital gate, according to some example implementations.

FIG. 5 is a flow diagram illustrating operations to continuously secure a device session of a client device, whereby the client device remains within the beacon mesh network 102, according to some example implementations. After the client device is initially authorized and granted access, the beacon mesh 102 continues to secure the network. With each request for resource by the client device (Client X), a challenge response and session identifier is included with the request. The request is detected by the closest compute beacon in the beacon mesh 102 to the client device. Upon receipt, the beacon mesh 102 performs various checks. The checks include checking the network integrity of the beacon mesh 102 (e.g., that the beacon mesh 102 is still intact), checking that the client device is still within the digital gate 200 using the provided session identifier, and checking that the decrypted challenge is correct. Based on the beacon mesh 102 still being intact, the client device still within the digital gate 200 using the provided session identifier, and the decrypted challenge being correct, a new encrypted challenge is generated. The requested response along with the new encrypted challenge and the session identifier are transmitted back to the client device.

Figure 6:
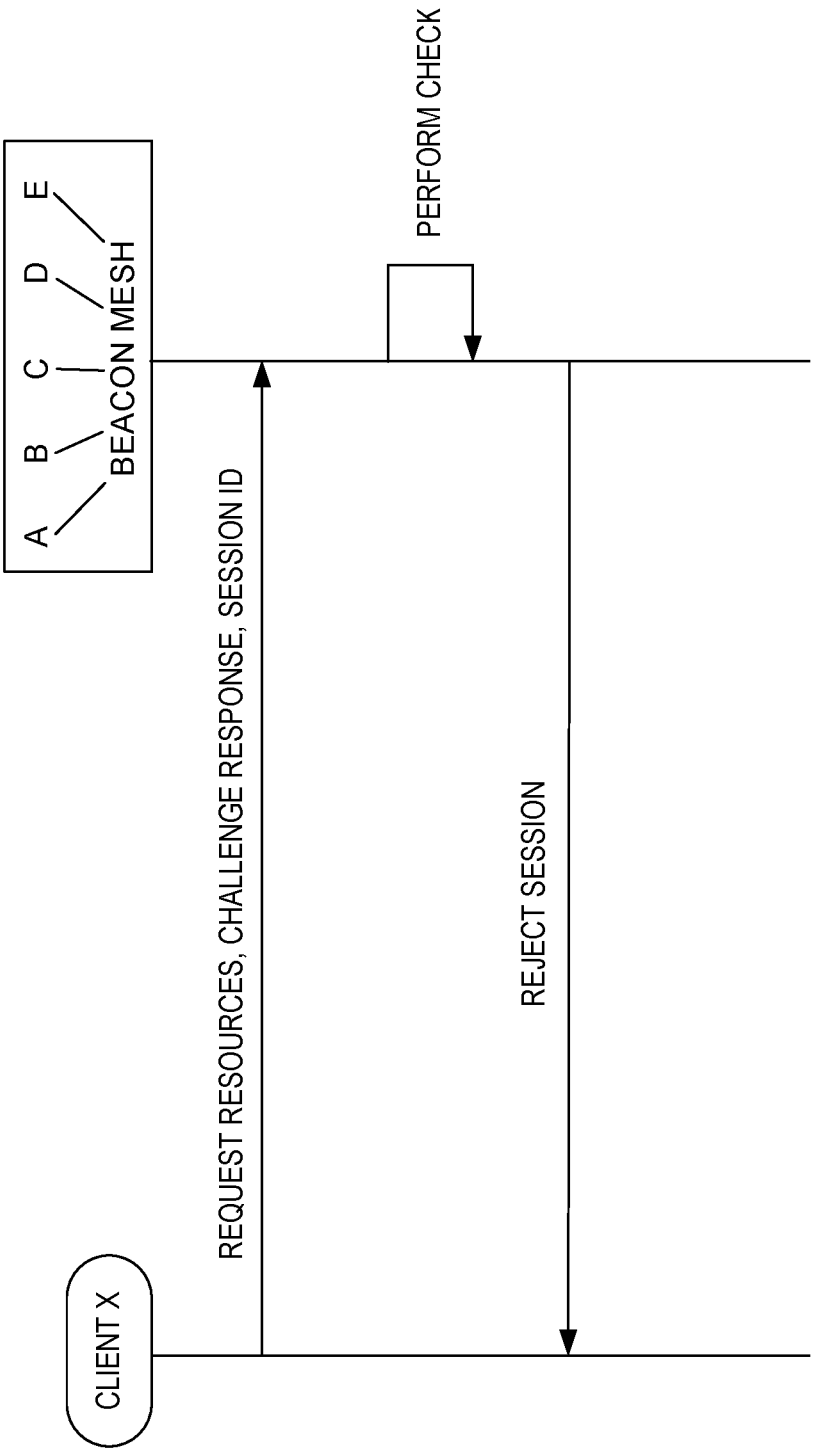
FIG. 6 is a flow diagram illustrating operations to continuously secure a device session, whereby the client device is detected to no longer be within the digital gate, according to some example implementations.

FIG. 6 is a flow diagram illustrating operations to continuously secure a device session of a client device, whereby the client device is detected to no longer be within the beacon mesh network 102, according to some example implementations. As with the implementation of FIG. 5, with each subsequent request for resource by the client device (Client X), a challenge response and session identifier is included with the request. The request is detected by the closest compute beacon in the beacon mesh 102 to the client device. Upon receipt, the beacon mesh 102 performs the various checks. In the implementation of FIG. 6, one or more of the checks is negative or invalid. That is the beacon mesh 102 is not intact, the client device is not within the digital gate 200 using the provided session identifier, and/or the decrypted challenge is incorrect. In response, the beacon mesh 102 rejects the session. The rejection may include denying the requested resource, transmitting a signal to the client device to shut it down, and/or transmitting a signal to cause the client device to lock. The anomaly can also be reported by the beacon mesh 102 to the anomaly detection system 108. In some implementations, if the client device does not receive a challenge (e.g., during authentication or resource request), then the session is disconnected and the device may shut off.

While example implementations discuss using ultrawide band or millimeter wavelength as the signal, other types of signals could be used in alternative implementations. For example, light emission rays and physical light detection can be used to determine locations and distances.

Figure 7:
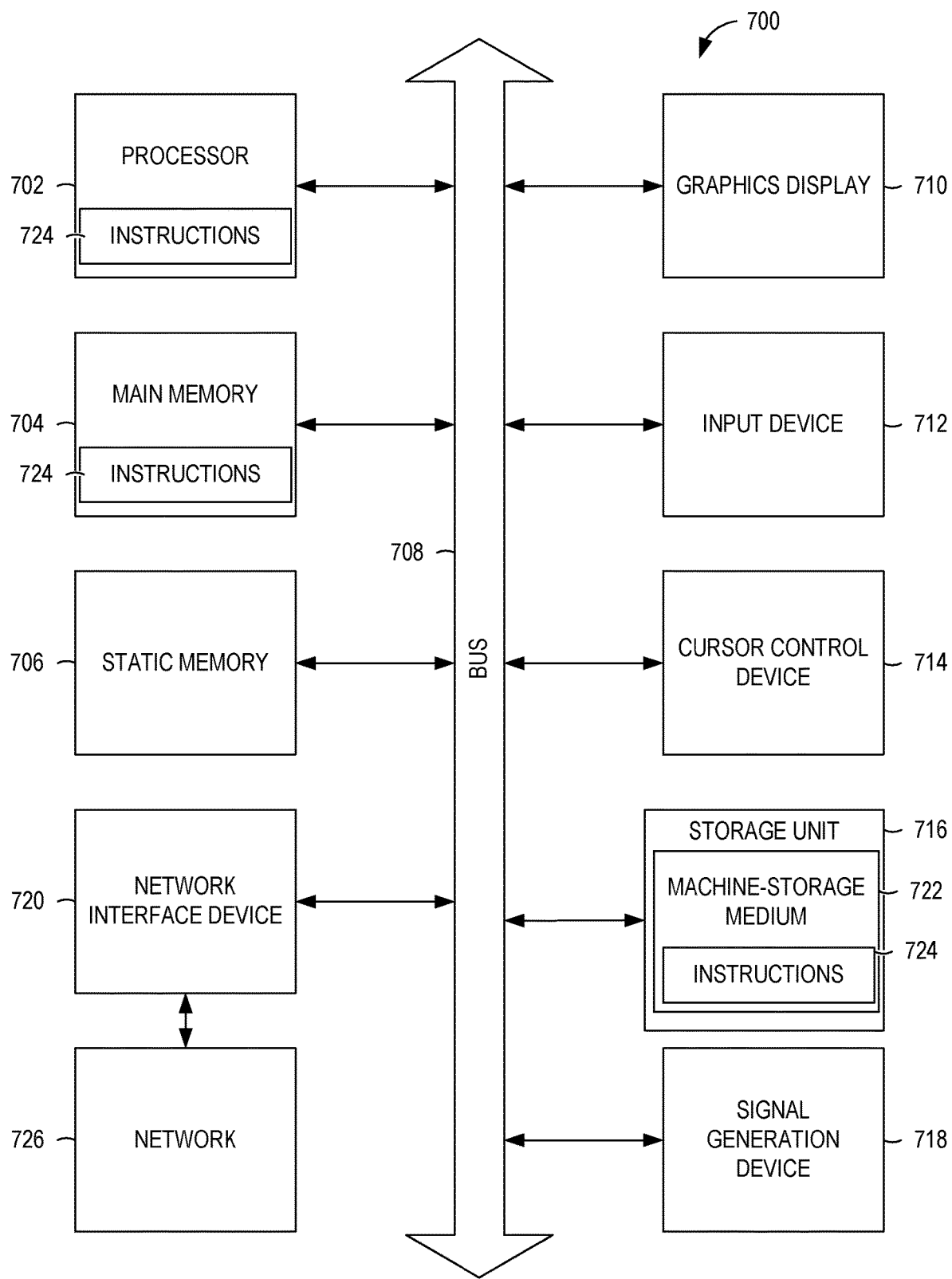
FIG. 7 is a block diagram illustrating components of a machine, according to some example implementations, able to read instructions from a machine-storage medium and perform any one or more of the methodologies discussed herein.

FIG. 7 illustrates components of a machine 700, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute some of the operations of the flow diagrams of FIG. 3 to FIG. 6. In one implementation, the instructions 724 can transform the machine 700 into a particular machine (e.g., specially configured machine) programmed to carry out the described and illustrated functions in the manner described.

In alternative implementations, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a compute beacon, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes one or more of a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

In some implementations, the machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example implementations, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium," and "device-readable medium" mean the same thing and may be used interchangeably in this disclosure. The terms are defined to include both machine-storage medium/media and signal medium/media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for securing network access using a digital gate constructed by position-aware compute beacons that form a beacon mesh. The method comprises detecting, by a compute beacon in a beacon mesh, a request for access from a client device; performing, by the beacon mesh, a validation process to validate that the client device is located within a digital gate formed by the beacon mesh, the validation process comprising detecting, by at least three compute beacons within the beacon mesh, a received signal strength indicator (RSSI) from the client device; triangulating, by the beacon mesh, a position of the client device based on the RSSI; and determining, by the beacon mesh, whether the position of the client device is within the digital gate; and based on a result of the validation process, providing, by the compute beacon, a reply to the client device, the reply comprising a challenge request or a session rejection.

In example 2, the subject matter of example 1 can optionally include, in response to receiving the request for access, performing a check on an integrity of the beacon mesh.

In example 3, the subject matter of any of examples 1-2 can optionally include wherein performing the check on the integrity comprises determining that all compute beacons within the beacon mesh are present based on a census.

In example 4, the subject matter of any of examples 1-3 can optionally include, in response to verifying the integrity, transmitting an authentication request to the client device by the compute beacon; and receiving, from the client device by the compute beacon, a response to the authentication request, wherein the performing the validation process is in response to receiving the response to the authentication request.

In example 5, the subject matter of any of examples 1-4 can optionally include wherein the session rejection is sent based on the validation process indicating that the client device is not within the digital gate.

In example 6, the subject matter of any of examples 1-5 can optionally include wherein the challenge request is sent based on the validation process indicating that the client device is within the digital gate.

In example 7, the subject matter of any of examples 1-6 can optionally include receiving, by the compute beacon, a response to the challenge request; relaying the response to the challenge request to an authentication system; and based on authentication by the authentication system, granting access to the client device by the compute beacon.

In example 8, the subject matter of any of examples 1-7 can optionally include, after granting access, receiving, by the beacon mesh from the client device, a request for resources, a current challenge response, and a session identifier; performing, by the beacon mesh, a check of the current challenge response and a further validation process to validate that the client device remains located within the digital gate; and based on the performing the check indicating valid, transmitting the resources, a new challenge, and the session identifier to the client device.

In example 9, the subject matter of any of examples 1-8 can optionally include, after granting access, receiving, by the beacon mesh from the client device, a request for resources, a current challenge response, and a session identifier; performing, by the beacon mesh, a check of the current challenge response and a further validation process to validate that the client device remains located within the digital gate; and based on the performing the check indicating invalid, transmitting an indication of rejection of the session.

In example 10, the subject matter of any of examples 1-9 can optionally include performing an initialization process for the beacon mesh, the performing the initialization process comprising detecting, by each compute beacon in the beacon mesh, a known location and RSSI from a known beacon in the beacon mesh; and based on the RSSI and known location, determining a location of each beacon relative to the known beacon in the beacon mesh.

In example 11, the subject matter of any of examples 1-10 can optionally include performing an initialization process for the beacon mesh, the performing the initialization process comprising generating a census comprising a unique identifier of each compute beacon detected within the beacon mesh; and distributing the census to each of the compute beacons in the beacon mesh.

In example 12, the subject matter of any of examples 1-11 can optionally include receiving, by one of the compute beacons of the beacon mesh, a notification from a bastion beacon that indicates detection of a second client device, the bastion beacon being a beacon located outside of the digital gate and detecting client devices physically located outside of the digital gate; and based on receiving the notification, rejecting a request for access or request for resources from the second client device In example 13, the subject matter of any of examples 1-12 can optionally include in response to detecting that an integrity of the beacon mesh is compromised, triggering an anomaly detection system to perform an action, the action including generating and providing a notification of an anomaly.

In example 14, the subject matter of any of examples 1-13 can optionally include triggering, via an operator system, a reinitialization process for the beacon mesh, the triggering being based on an addition of a new beacon or a removal of a beacon previously in the beacon mesh.

Example 15 is a system for securing network access using a digital gate constructed by position-aware compute beacons that form a beacon mesh. The system comprises a plurality of compute beacons that form a beacon mesh, the beacon mesh performs operations comprising detecting, by a compute beacon in the beacon mesh, a request for access from a client device; performing, by the beacon mesh, a validation process to validate that the client device is located within a digital gate formed by the beacon mesh, the validation process comprising detecting, by at least three compute beacons within the beacon mesh, a received signal strength indicator (RSSI) from the client device; triangulating, by the beacon mesh, a position of the client device based on the RSSI; and determining, by the beacon mesh, whether the position of the client device is within the digital gate; and based on a result of the validation process, providing, by the compute beacon, a reply to the client device, the reply comprising a challenge request or a session rejection.

In example 16, the subject matter of example 15 can optionally include wherein the operations further comprise in response to receiving the request for access, performing a check on an integrity of the beacon mesh.

In example 17, the subject matter of any of examples 15-16 can optionally include wherein the operations further comprise receiving, by the compute beacon, a response to the challenge request; relaying the response to the challenge request to an authentication system; and based on authentication by the authentication system, granting access to the client device by the compute beacon.

In example 18, the subject matter of any of examples 15-17 can optionally include wherein the operations further comprise performing an initialization process for the beacon mesh, the performing the initialization process comprising detecting, by each compute beacon in the beacon mesh, a known location and RSSI from a known beacon in the beacon mesh; based on the RSSI and known location, determining a location of each beacon relative to the known beacon in the beacon mesh; and generating and distributing a census comprising a unique identifier of each compute beacon detected within the beacon mesh.

In example 19, the subject matter of any of examples 15-18 can optionally include wherein the operations further comprise receiving, by one of the compute beacons of the beacon mesh, a notification from a bastion beacon that indicates detection of a second client device, the bastion beacon being a beacon located outside of the digital gate and detecting client devices physically located outside of the digital gate; and based on receiving the notification, rejecting a request for access or request for resources from the second client device.

Example 20 is a storage medium comprising instructions which, when executed by one or more processors of one or more machines, cause the one or more machines to perform operations for securing network access using a digital gate constructed by position-aware compute beacons that form a beacon mesh. The operations comprise detecting, by a compute beacon in a beacon mesh, a request for access from a client device; performing, by the beacon mesh, a validation process to validate that the client device is located within a digital gate formed by the beacon mesh, the validation process comprising detecting, by at least three compute beacons within the beacon mesh, a received signal strength indicator (RSSI) from the client device; triangulating, by the beacon mesh, a position of the client device based on the RSSI; and determining, by the beacon mesh, whether the position of the client device is within the digital gate; and based on a result of the validation process, providing, by the compute beacon, a reply to the client device, the reply comprising a challenge request or a session rejection.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various implementations of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    detecting, by a compute beacon in a beacon mesh, a request for access to a secured network or a secured device from a client device;
    in response to receiving the request for access, performing, by the compute beacon, an integrity check of the beacon mesh to ensure that all compute beacons listed in a census are present and that no additional compute beacons are detected, the census being generated by an origin beacon of the beacon mesh with a known location during an initialization process;
    based on the integrity check, performing, by the beacon mesh, a validation process to validate that the client device is located within a digital gate formed by the beacon mesh, the validation process comprising:
        detecting, by at least three compute beacons within the beacon mesh, a received signal strength indicator (RSSI) from the client device;
        triangulating, by the beacon mesh, a position of the client device based on the RSSI; and
        determining, by the beacon mesh, whether the position of the client device is within the digital gate; and
    based on a result of the validation process, providing, by the compute beacon, a reply to the client device, the reply comprising a challenge request or a session rejection that rejects access to the secured network or the secured device.

2. The method of claim 1, further comprising:
    upon completion of the initialization process, distributing, by the origin beacon, the census to every other compute beacon in the beacon mesh allowing each compute beacon of the beacon mesh to perform integrity checks.

3. The method of claim 1, wherein the census comprises a unique identifier and a location of each compute beacon of the beacon mesh, each location being determined by a respective compute beacon based on a received signal strength indicator (RSSI) from at least one other compute beacon in the beacon mesh.

4. The method of claim 1, further comprising:
    in response to the integrity check, transmitting an authentication request to the client device by the compute beacon; and
    receiving, from the client device by the compute beacon, a response to the authentication request, wherein the performing the validation process is in response to receiving the response to the authentication request.

5. The method of claim 1, wherein the session rejection is sent based on the validation process indicating that the client device is not within the digital gate, the session rejection comprising denying the request for access to the secured network or the secured device, transmitting a signal to the client device to shut it down, or transmitting a signal to cause the client device to lock.

6. The method of claim 1, wherein the challenge request is sent based on the validation process indicating that the client device is within the digital gate.

7. The method of claim 1, further comprising:
receiving, by the compute beacon, a response to the challenge request;
relaying the response to the challenge request to an authentication system; and
based on authentication by the authentication system, granting access to the client device by the compute beacon.

8. The method of claim 7, further comprising:
after granting access, receiving, by the beacon mesh from the client device, a request for a resource, a challenge response that corresponds to a most recent challenge issued to the client device, and a session identifier;
performing, by the beacon mesh, a check of the challenge response to authenticate the client device for a session identified by the session identifier and a further validation process to validate that the client device remains located within the digital gate; and
based on the performing the check indicating the challenge response is valid and the further validation process indicating the client device remains located within the digital gate, transmitting the resource, a new challenge, and the session identifier to the client device.

9. The method of claim 7, further comprising:
after granting access, receiving, by the beacon mesh from the client device, a request for a resource, a challenge response that corresponds to a most recent challenge issued to the client device, and a session identifier;
performing, by the beacon mesh, a check of the challenge response to authenticate the client device for a session identified by the session identifier and a further validation process to validate that the client device remains located within the digital gate; and
based on the performing the check indicating the challenge response is invalid or the further validation process indicating the client device is outside the digital gate, transmitting an indication of rejection of the session, the indication comprising denying the request for the resource, transmitting a signal to the client device to shut it down, or transmitting a signal to cause the client device to lock.

10. The method of claim 1, further comprising performing an initialization process for the beacon mesh, the performing the initialization process comprising:
detecting, by each compute beacon in the beacon mesh other than the origin beacon, the known location and a received signal strength indicator (RSSI) from the origin beacon;
based on the RSSI and the known location, determining, by each compute beacon other than the origin beacon, its location relative to the origin beacon; and
generating, by the origin beacon, the census using the determined location received from each compute beacon other than the origin beacon.

11. The method of claim 1, further comprising:
in response to detecting an anomaly in a subsequent integrity check, triggering a reinitialization process for the beacon mesh to update the census and reconfigure the digital gate.

12. The method of claim 1, further comprising:
receiving, by one of the compute beacons of the beacon mesh, a notification from a bastion beacon that indicates detection of a second client device, the bastion beacon being a beacon located outside of the digital gate and detecting client devices physically located outside of the digital gate; and
based on receiving the notification, revoking access to the secured network or the secured device for the second client device that was previously granted.

13. The method of claim 1, further comprising:
in response to detecting that an integrity of the beacon mesh is compromised, triggering an anomaly detection system to perform an action, the action including generating and providing a notification of an anomaly.

14. The method of claim 1, further comprising:
triggering, via an operator system, a reinitialization process for the beacon mesh, the triggering being based on an addition of a new compute beacon or a removal of a compute beacon previously in the beacon mesh.

15. A system comprising,
a plurality of compute beacons that form a beacon mesh, the beacon mesh configured to perform operations comprising:
detecting, by a compute beacon in the beacon mesh, a request for access to a secured network or a secured device from a client device;
in response to receiving the request for access, performing, by the compute beacon, an integrity check of the beacon mesh to ensure that all compute beacons listed in a census are present and that no additional compute beacons are detected, the census being generated by an origin beacon of the beacon mesh with a known location during an initialization process;
based on the integrity check, performing, by the beacon mesh, a validation process to validate that the client device is located within a digital gate formed by the beacon mesh, the validation process comprising:
detecting, by at least three compute beacons within the beacon mesh, a received signal strength indicator (RSSI) from the client device;
triangulating, by the beacon mesh, a position of the client device based on the RSSI; and
determining, by the beacon mesh, whether the position of the client device is within the digital gate; and
based on a result of the validation process, providing, by the compute beacon, a reply to the client device, the reply comprising a challenge request or a session rejection that rejects access to the secured network or the secured device.

16. The system of claim 15, wherein the operations further comprise:
upon completion of the initialization process, distributing, by the origin beacon, the census to every other compute beacon in the beacon mesh allowing each compute beacon of the beacon mesh to perform integrity checks.

17. The system of claim 15, wherein the operations further comprise:
receiving, by the compute beacon, a response to the challenge request;
relaying the response to the challenge request to an authentication system; and
based on authentication by the authentication system, granting access to the client device by the compute beacon.

18. The system of claim 15, wherein the operations further comprise:

in response to detecting an anomaly in a subsequent integrity check, triggering a reinitialization process for the beacon mesh to update the census and reconfigure the digital gate.

19. The system of claim 15, wherein the operations further comprise:

receiving, by one of the compute beacons of the beacon mesh, a notification from a bastion beacon that indicates detection of a second client device, the bastion beacon being a beacon located outside of the digital gate and detecting client devices physically located outside of the digital gate; and based on receiving the notification, revoking access to the secured network or the secured device for the second client device that was previously granted.

20. A non-transitory machine-storage medium comprising instructions which, when executed by one or more processors of one or more machines, cause the one or more machines to perform operations comprising:

detecting, by a compute beacon in a beacon mesh, a request for access to a secured network or a secured device from a client device;

in response to receiving the request for access, performing, by the compute beacon, an integrity check of the beacon mesh to ensure that all compute beacons listed in a census are present and that no additional compute beacons are detected, the census being generated by an origin beacon of the beacon mesh with a known location during an initialization process;

based on the integrity check, performing, by the beacon mesh, a validation process to validate that the client device is located within a digital gate formed by the beacon mesh, the validation process comprising:

detecting, by at least three compute beacons within the beacon mesh, a received signal strength indicator (RSSI) from the client device;

triangulating, by the beacon mesh, a position of the client device based on the RSSI; and determining, by the beacon mesh, whether the position of the client device is within the digital gate; and based on a result of the validation process, providing, by the compute beacon, a reply to the client device, the reply comprising a challenge request or a session rejection that rejects access to the secured network or the secured device.

* * * * *